United States Patent
Shterman et al.

(10) Patent No.: US 12,184,767 B2
(45) Date of Patent: Dec. 31, 2024

(54) COMBINED IMAGING AND QUANTUM CRYPTOGRAPHY APPARATUS

(71) Applicant: IMAGESAT INTERNATIONAL (I.S.I.) LTD., Or Yehuda (IL)

(72) Inventors: Doron Shterman, Tel-Aviv (IL); Shlomo Indy, Kfar Saba (IL)

(73) Assignee: IMAGESAT INTERNATIONAL (I.S.I.) LTD., Or Yehuda (IL)

( * ) Notice: Subject to any disclaimer, the term of this patent is extended or adjusted under 35 U.S.C. 154(b) by 0 days.

(21) Appl. No.: 18/316,588

(22) Filed: May 12, 2023

(65) Prior Publication Data
US 2023/0308268 A1  Sep. 28, 2023

Related U.S. Application Data

(63) Continuation of application No. 16/801,270, filed on Feb. 26, 2020, now Pat. No. 11,652,618.

(51) Int. Cl.
*H04L 9/08* (2006.01)
*G02B 27/10* (2006.01)
(Continued)

(52) U.S. Cl.
CPC ........ *H04L 9/0855* (2013.01); *G02B 27/1013* (2013.01); *G02B 27/126* (2013.01);
(Continued)

(58) Field of Classification Search
CPC .. H04N 25/76; G02B 27/1013; G02B 27/126; H04B 10/50; H04B 10/66; H04B 10/70; H04L 9/083
(Continued)

(56) References Cited

U.S. PATENT DOCUMENTS

| | | | | |
|---|---|---|---|---|
| 5,966,224 A | * | 10/1999 | Hughes | H04L 9/0858 |
| | | | | 398/40 |
| 9,306,740 B2 | | 4/2016 | Bowes | H04L 9/0858 |

(Continued)

FOREIGN PATENT DOCUMENTS

| | | | | |
|---|---|---|---|---|
| CA | 3157137 A1 | * | 5/2021 | H04B 10/118 |
| CA | 3206620 A1 | * | 8/2022 | H04L 9/085 |

(Continued)

OTHER PUBLICATIONS

Scheidl et al ;Space-to-Ground Quantum key Distribution; Oct. 2018; International Conference on Space Optics; pp. 1-8. (Year: 2018).*

(Continued)

*Primary Examiner* — Amritbir K Sandhu
(74) *Attorney, Agent, or Firm* — FISHERBROYLES, LLP.; Roger L. Browdy; James E. Mrose

(57) ABSTRACT

An imaging and quantum cryptography apparatus comprising a light-refracting optical setup (10 a light-directing optical setup (102), an imaging sensor (103) capturing light refracted the light-refracting optical setup and directed to the imaging sensor by the light-directing optical setup and at least one of a quantum distribution (QKD) transmitter (104) generating a QKD light signal and transmitting QKD light signal via the light-directing optical setup and through the light-refracting optical setup and a QKD receiver (105) acquiring and decoding light signals refracted from the light-refracting optical setup and directed to the QKD receiver by the light-directing optical setup. The imaging sensor, the at least one of QKD transmitter and QKD receiver, and the alignment unit, all use the same light-directing optical setup and the same light-refracting optical setup.

5 Claims, 4 Drawing Sheets

(51) Int. Cl.
  *G02B 27/12* (2006.01)
  *H04B 10/50* (2013.01)
  *H04B 10/66* (2013.01)
  *H04B 10/70* (2013.01)
  *H04N 25/76* (2023.01)

(52) U.S. Cl.
  CPC ............ *H04B 10/50* (2013.01); *H04B 10/66* (2013.01); *H04B 10/70* (2013.01); *H04L 9/083* (2013.01); *H04N 25/76* (2023.01)

(58) Field of Classification Search
  USPC ........................................................ 380/279
  See application file for complete search history.

(56) References Cited

U.S. PATENT DOCUMENTS

| | | | | |
|---|---|---|---|---|
| 9,866,379 | B2 | 1/2018 | Nordholt | H04B 10/70 |
| 10,333,701 | B2* | 6/2019 | Kwiat | H04L 9/0852 |
| 2001/0055389 | A1* | 12/2001 | Hughes | H04L 9/0858 380/44 |
| 2008/0107417 | A1 | 5/2008 | Pitwon | H04J 14/02 398/82 |
| 2008/0175385 | A1* | 7/2008 | Lee | H04L 9/0855 380/278 |
| 2010/0182415 | A1* | 7/2010 | Elster | A61B 90/361 600/476 |
| 2012/0051755 | A1* | 3/2012 | Arahira | H04B 10/70 398/158 |
| 2012/0230493 | A1* | 9/2012 | Bowes | H04L 9/0858 380/278 |
| 2015/0125157 | A1* | 5/2015 | Chao | H04B 10/118 398/122 |
| 2015/0236852 | A1* | 8/2015 | Tanizawa | H04L 9/0858 380/278 |
| 2016/0072580 | A1 | 3/2016 | Wabnig | H04L 9/0852 398/131 |
| 2017/0073088 | A1* | 3/2017 | Jeon | B64G 1/244 |
| 2018/0375650 | A1* | 12/2018 | Legre | H04L 9/0855 |
| 2022/0215279 | A1* | 7/2022 | Rahman | B82Y 20/00 |
| 2024/0106637 | A1* | 3/2024 | Yeomans | H04L 45/42 |

FOREIGN PATENT DOCUMENTS

| | | | | |
|---|---|---|---|---|
| CN | 108512623 | A * | 9/2018 | H04J 14/0241 |
| WO | WO-2009093037 | A1 * | 7/2009 | H04B 10/70 |
| WO | 2018/134799 | A1 | 7/2018 | |

OTHER PUBLICATIONS

Stefano et al; Satellite quantum communications: Fundamental bounds and practical security; May 2021; Department of Computer Science, University of York, pp. 1-29. (Year: 2021).

Nauerth et al; Air to ground Quantum key distribution, Jul. 2013; University of Munchen, pp. 1-119. (Year: 2013).

Hemmati, et al., A Combined Laser-communication and Imager for Microspacecraft, Proc. SPIE 3266, Free-Space Laser Communication Technologies x, May 27, 1998, pp. 1-6.

Nauerth, Sebastian, Air to Ground Quantum Key Distribution, Dissertation an der Fakultat Physik der Ludwig-Maximilians—Universitat Munchen, 2013, pp. 1-119.

Pugh, et al., Airborne demonstration of a quantum key distribution receiver payload, Quantum Sci. Technol., 2:1-10 (2017).

Search Report—ILPO dated Jul. 25, 2019, from corresponding IL Application No. 265075.

Naughton et al; Design considerations for an optical link supporting intersatellite quantum key distribution; Jan. 2019; SPIE digital library; pp. 1-14. (Year: 2019).

Scheidl et al; Space to ground quantum key distribution; International Conference on Space Optics; Oct. 2018; International Conference on Space Optics; pp. 1-8. (Year: 2018).

Sharma et al; Tracking challenges of QKD over relay satellite; International Conference on Space Optics; Oct. 2018; pp. 1-9. (Year: 2018).

European Search Report and the European Search Opinion Dated Jun. 24, 2020 From the European Patent Office Re. Application No. 20159640.0. (10 Pages).

Wikipedia "Dichroic Prism", Wikipedia, XP055701879, 2 P., Sep. 21, 2018.

Office Action Dated Mar. 10, 2020 From the Israel Patent Office Re. Application No. 265075 and Its Translation Into English. (16 Pages).

Office Action Dated Jul. 25, 2019 From the Israel Patent Office Re. Application No. 265075. (5 Pages).

Nauerth et al. "Air to Ground Quantum Key Distribution", Quantum Communications and Quantum Imaging X, Proceedings of the SPIE, 8518: 85180D-1-85180D-6, Oct. 25, 2012.

Oi et al. "CubeSat Quantum Communications Mission", EPJ Quantum Technology, 4(1): 6-1-6-20, 2017.

* cited by examiner

COMBINED IMAGING AND QUANTUM CRYPTOGRAPHY APPARATUS

RELATED APPLICATION(S)

This application claims the benefit of priority of Israel Patent Application No. 265075 filed on Feb. 26, 2019, the contents of which are all incorporated by reference as if fully set forth herein in their entirety.

FIELD AND BACKGROUND OF THE INVENTION

The present invention, in some embodiments thereof, relates to an imaging and quantum cryptography apparatus and, more particularly, but not exclusively, to a combined electro-optical (EO) remote sensing payload architecture with quantum key distribution (QKD) capabilities.

Modern EO remote sensing payloads are designed to collect emitted and/or reflected EM signal from a target and create a digital representation of that signal in the form of an image. EO payloads are common in multiple un-manned platforms like cars, aircrafts, drones, satellites etc., where the platform role with respect to the EO payload is to provide the essential operational conditions in terms of physical requisites like power conditioning, I/O interfaces, thermal conduction, structural integrity etc. as well as logic of operation.

QKD is a form of secured communication method which, by the use of quantum mechanics foundations, enables two communication nodes to share a random secret encryption key exclusively. QKD systems are usually implemented by photonic communication channels and mediums like fiber optics, or free space, due to the widespread utilization of a single photon as the atomic quantum element. Though fiber based QKD is inherently limited in supporting long distances communication, due to optical signal attenuation within fibers and the lack of quantum repeaters, free-space form of QKD is able to overcome this drawback due to low atmosphere absorption in certain wavelength range.

SUMMARY OF THE INVENTION

According to an aspect of some embodiments of the present invention there is provided an imaging and quantum cryptography apparatus, comprising: a light-refracting optical setup; a light-directing optical setup; an imaging sensor capturing light refracted from the light-refracting optical setup and directed to the imaging sensor by the light-directing optical setup; at least one of: a quantum key distribution (QKD) transmitter generating a QKD light signal and transmitting the QKD light signal via the light-directing optical setup and through the light-refracting optical setup; a QKD receiver acquiring and decoding light signals refracted from the light-refracting optical setup and directed to the QKD receiver by the light-directing optical setup; and an alignment unit aligning the at least one of QKD transmitter and QKD receiver to a coupled QKD apparatus.

Optionally, the apparatus further comprises: a controller operating the imaging sensor, the alignment unit, the QKD transmitter and the QKD receiver.

Optionally, the light-directing optical setup includes a beam-splitting optical setup which is separating light by wavelength.

More optionally, the beam-splitting optical setup includes a tri-chroic prism assembly.

Optionally, the alignment unit includes a beacon device for locking and tracking the light signals.

Optionally, the light-refracting optical setup includes a telescope.

Optionally, the imaging sensor includes a high resolution camera.

Optionally, the apparatus is included in payload architecture for use in an un-manned platform.

Optionally, the controller is operating the imaging sensor, the QKD transmitter and the QKD receiver based on location of the apparatus.

According to some embodiments of the invention there is provided a system comprising: the apparatus and a QKD device coupled with the apparatus.

According to an aspect of some embodiments of the present invention there is provided a method of controlling an imaging and quantum cryptography apparatus, comprising: instructing an imaging sensor to capture light refracting from a light-refracting optical setup and directed into the imaging sensor by a light-directing optical setup; instructing a quantum key distribution (QKD) transmitter to generate a QKD light signal and transmit the QKD light signal via the light-directing optical setup and through the light-refracting optical setup; and instructing an alignment unit to align the QKD transmitter to a coupled QKD apparatus.

Optionally, the method further comprises: instructing a QKD receiver to acquire and decode light signals refracted from the light-refracting optical setup and directed by a light-directing optical setup into the QKD receiver.

Optionally, the method further comprises, before the instructing of the QKD: orienting the light-refracting optical setup to the direction of the coupled QKD apparatus.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
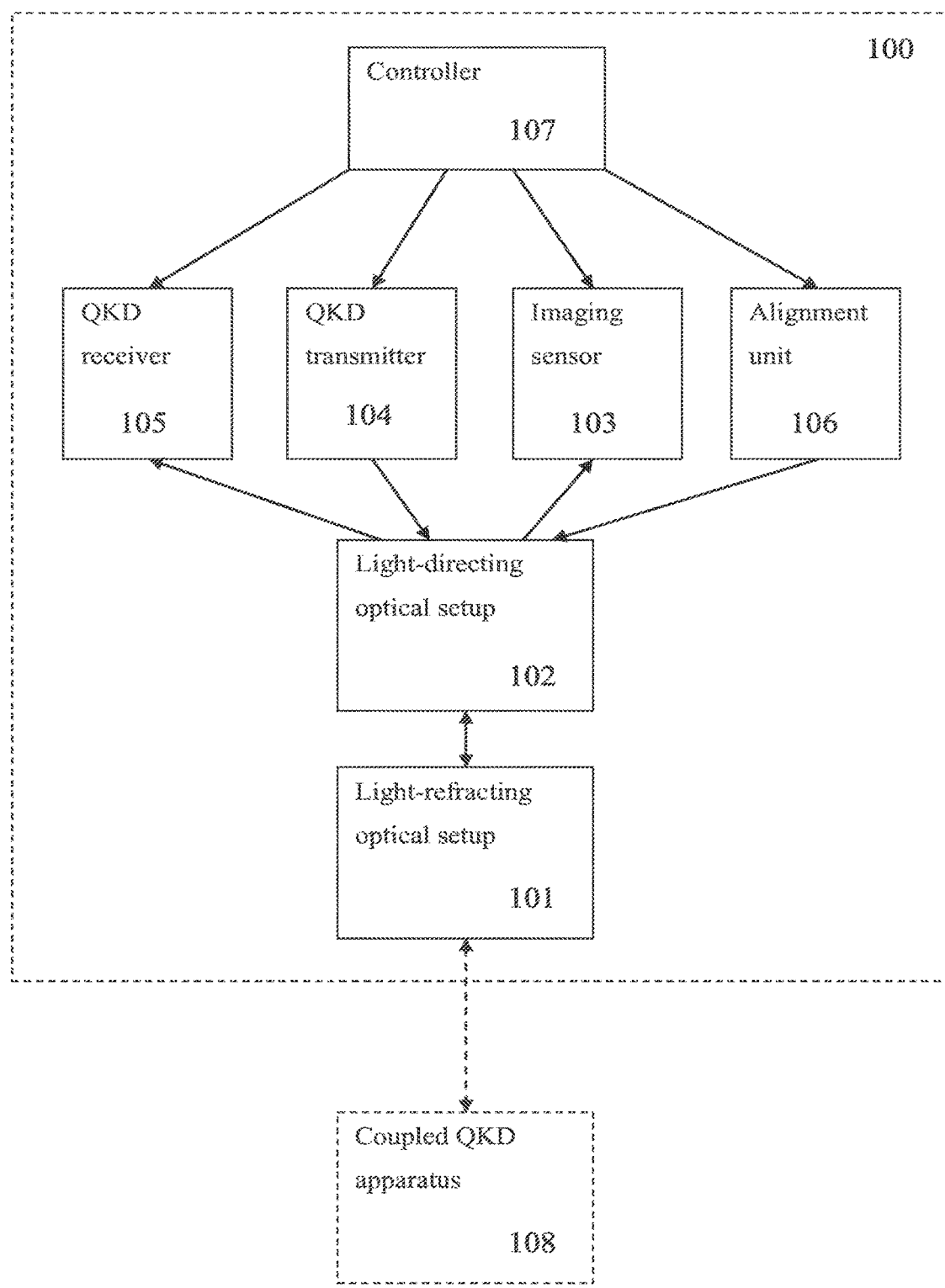
FIG. 1 is a schematic illustration of an imaging and quantum cryptography apparatus, according to some embodiments of the present invention.

The present invention, in some embodiments thereof, relates to an imaging and quantum cryptography apparatus and, more particularly, but not exclusively, to a combined electro-optical (EO) remote sensing payload architecture with quantum key distribution (QKD) capabilities.

To allow operation of a QKD system, it is required to transmit the relevant optical signal with minimal optical aberrations. Therefore, the optical quality of the optical setup, as well as the structural and thermal stability and pointing accuracy of the entire system, must be high. Some EO remote sensing payload architectures are satisfying these requirements. For very high resolution EO payloads the optical prescription is usually highly demanding, where the ultimate goal is to design a diffraction-limited system in order to achieve superior imaging performance. Where implemented on an un-stable platform, or when subject to harsh environmental conditions, substantial effort is also given to mitigating mutual effects between the payload and the platform or the operational environment. The overall system accuracies required for creating a very-high resolution imagery product might, is some cases, be sufficient also for supporting the optical link required for successful QKD operations. An apparatus supporting both a very-high resolution imaging capability as well as QKD operation utilizing a single payload architecture, as proposed herein, is hence unique and essential.

According to some embodiments of the present invention, there is provided an imaging and quantum cryptography apparatus, which includes both optical remote sensing and QKD capabilities. The apparatus includes an imaging sensor (such as a camera) and a QKD system (including a QKD transmitter and/or a QKD receiver, and an alignment unit), both using the same light-refracting optical setup (such as a telescope). A light-directing optical setup (such as a beam splitter) directs the light from the light-refracting optical setup to the imaging sensor, the QKD receiver and the alignment unit, and from the QKD transmitter to the light-refracting optical setup.

Combining remote sensing with QKD within a single payload architecture can significantly leverage the remote sensing platform capabilities and provide complementary utilization of both frequency and time domains. While a typical remote sensing payload is optimized for particular electromagnetic (EM) spectrum harvesting, as well as to specific data collection method, free space QKD can be implemented as an additional layer of the payload to operate within a matching part of the EM spectrum and utilized symbiotically with the payload's main data collection task.

While remote sensing is traditionally implemented for a variety of applications and in a wide range of optical frequencies, even well beyond the visible spectrum (390 nm to 700 nm), most EO payloads are usually tailored for a specific optical bandwidth in term of the optics architecture, sensor performance, analog and digital processing as well as in their operational logic. On the other hand, QKD is somewhat un-biased for any particular optical frequency given a positive optical link budget between the transmitting and receiving nodes. Hence, sharing a unified optical design, both remote sensing and QKD missions may be readily achieved in terms of spectrum division allowing simultaneous operation if needed.

Also, some remote sensing systems, for example remote sensing satellites are utilized for image acquisition only during some durations of their operation time. It is therefore highly beneficial to utilize these durations for QKD missions.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a schematic illustration of an imaging and quantum cryptography apparatus, according to some embodiments of the present invention.

The apparatus 100 includes a light-refracting optical setup 101, a light-directing optical setup 102, an imaging sensor 103, a QKD transmitter 104 and/or a QKD receiver 105, and an alignment unit 106. The apparatus 100 may be included in payload architecture for use in an un-manned platform.

The light-refracting optical setup 101 lodes an arrangement of lenses and/or mirrors. The light-refracting optical setup 101 may include, for example, a telescope, which gathers and focuses light. In order for the QKD transmitter 104 to generate significant amount of quantum-keys per session, and for the imaging sensor 103 to acquire high resolution images, the light-refracting optical setup 101 should be of high optical quality. This means that the light-refracting optical setup 101 should be diffraction limited with zero expansions thermal behavior. In general, in order to support free-space QKD optical link the optical system shall essentially support a two-way classical optical link. The optical link "quality" or "link-budget" shall be sufficient though to support a "single" photon detection which might result in a very demanding system stability requirement, which is similar to what is required for a "very-high-resolution" imaging payload.

The light-directing optical setup 102 directs light to and from the light-refracting optical setup 101. The light-directing optical setup 102 may include, for example, a beam splitter, such as a cubic beam splitter. The light-directing optical setup 102 may include a beam-splitting optical setup which is separating light by wavelength, for example a tri-chroic prism assembly. Optionally and alternatively, the light-directing optical setup 102 may include a mirror which changes the direction of the reflected light to and from the light-refracting optical setup 101. Optionally and alternatively, the light-directing optical setup 102 may include a grating element, and/or any other component or combination thereof which directs light to another direction.

The imaging sensor 103 is capturing light refracted from the light-refracting optical setup 101 and directed to the imaging sensor 103 by the light-directing optical setup 102. The imaging sensor 103 includes, for example, a high resolution camera. The imaging sensor 103 may also include may include one or more light capturing sensors, for example, semiconductor charge-coupled devices (CCD), active pixel sensors in complementary metal-oxide-semiconductor (CMOS), N-type metal-oxide-semiconductor (NMOS or Live MOS) and/or any other sensor that detects and conveys light information used to make an image. Optionally, several imaging sensors may be used to increase the effective swath.

The apparatus 100 also includes a QKD transmitter 104 and/or a QKD receiver 105.

The QKD transmitter 104 is generating a QKD light signal and transmitting the QKD light signal via the light-directing optical setup 102 and through the light-refracting optical setup 101, to be transmitted to a QKD receiver of a coupled QKD apparatus 108.

The QKD receiver 105 is acquiring and decoding light signals which arrived from a QKD transmitter of the coupled QKD apparatus 108, refracted from the light-refracting optical setup 101 and directed to the QKD receiver by the light-directing optical setup 102.

The coupled QKD apparatus 108 may include a QKD transmitter and/or a QKD receiver, which sends and/or receives QKD signals to/from the apparatus 100, respectively. The coupled QKD apparatus 108 may include a similar QKD system as the apparatus 100. For example, when apparatus 100 is included in a satellite, the coupled QKD apparatus 108 may be included in a ground station or in another satellite.

The apparatus 100 also includes an alignment unit 106 aligning the QKD transmitter 104 and/or QKD receiver 105 to the QKD receiver and/or QKD transmitter of the coupled QKD apparatus 108, for acquiring an optical communication link between them timing, the QKD session. The alignment unit 106 may include, for example, a beacon device for locking and tracking the light signals, a passive retro-reflector and/or any other active or passive alignment architectures. Optionally, the alignment unit 106 may use the imaging sensor 103 for alignment, for example by receiving imaging input of the coupled QKD apparatus 108 from the imaging sensor 103.

Optionally, the apparatus 100 also includes a controller 107 operating the imaging sensor 103, the QKD transmitter 104 and/or the QKD receiver 105, the alignment unit 106 and optionally the light-refracting optical setup 101 and/or the light-directing optical setup 102. The controller 107 may include any kind of control device(s) and/or mechanism(s), which may be digital, mechanical and/or of any other kind. For example, the controller 107 may include a computer system having a processor which is executing software instructions that are stored in a memory.

Figure 2:
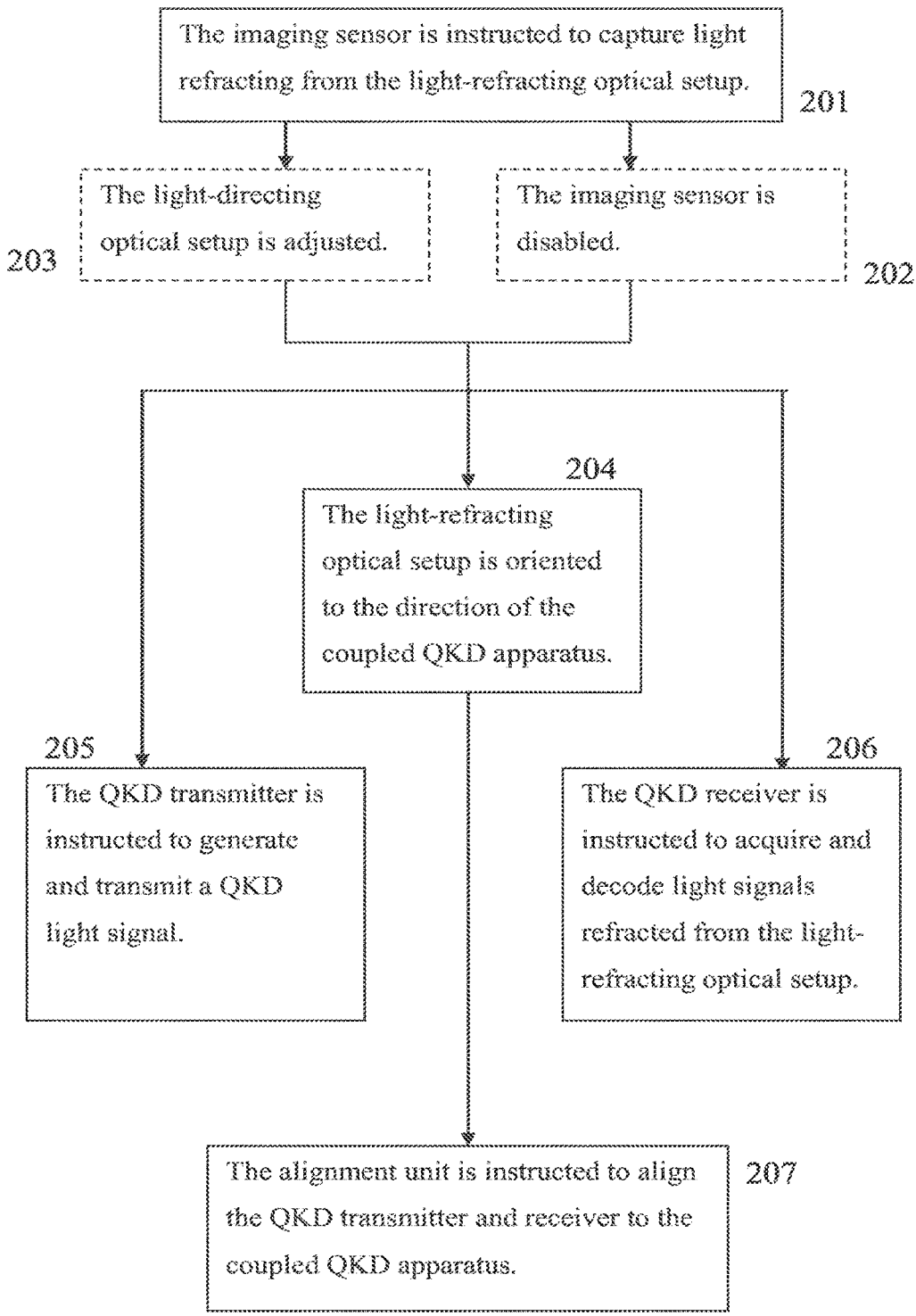
FIG. 2 is a flowchart schematically representing a method for controlling an imaging and quantum cryptography apparatus, for example by the controller, according to some embodiments of the present invention.

Reference is also made to FIG. 2, which is a flowchart schematically representing a method for controlling an imaging and quantum cryptography apparatus, for example by the controller 107, according to some embodiments of the present invention.

First, as shown at 201, the imaging sensor 103 is instructed to capture light refracting from and directed into die imaging sensor 103 by a light-directing optical setup 102.

The QKD system (QKD transmitter 104 and/or the QKD receiver 105) may be operated simultaneously or alternately to the imaging sensor 103. However, acquiring and image simultaneously with QKD operation would result in an image of the coupled QKD apparatus 108 itself.

Optionally, as shown at 202, imaging sensor 103 is disabled before the QKD system is operated. This may help, for example, in mitigating any thermal influences caused by the operation of the imaging sensor 103.

Optionally, as shown at 203, the light-directing optical setup 102 is adjusted to direct light refracting from the light-refracting optical setup 101 into the QKD receiver 105 and direct light from the QKD transmitter 104 into the light-refracting optical setup 101. For example mirrors of light-directing optical setup 102 are shifted accordingly.

Optionally, as shown at 204, the light-refracting optical setup 101 is oriented to the direction of the coupled QKD apparatus 108. This way, the coupled QKD apparatus 108 is in the "line-of-sight" of the apparatus 100, so light signals may be sent to the coupled QKD apparatus 108 and/or received from the coupled QKD apparatus 108.

Then, the QKD system is operated.

As shown at 205, the QKD transmitter 104 is instructed to generate a QKD light signal and transmit the QKD light signal via the light-directing optical setup 102 and through the light-refracting optical setup 101.

Additionally or alternatively, as shown at 206, the QKD receiver 105 is instructed to acquire and decode light signals refracted from the light-refracting optical setup 101 and directed into the QKD receiver 105 by the light-directing optical setup 102.

Also, as shown at 207, the alignment unit 106 is instructed to align the QKD transmitter 104 and/or QKD receiver 105 to the coupled QKD apparatus 108. The alignment unit 106 is used for aligning for example a space-based QKD apparatus to another ground-based QKD apparatus (or another space based QKD apparatus) during the QKD session (more specifically the receiver of one end with the transmitter of the other end and vice-versa).

Optionally, the imaging sensor 103, the QKD transmitter 104 and the QKD receiver 105 are operated based on location of the apparatus 100. For example, in some locations an image acquisition is required, while in other locations a QKD session may be used.

Figure 3:
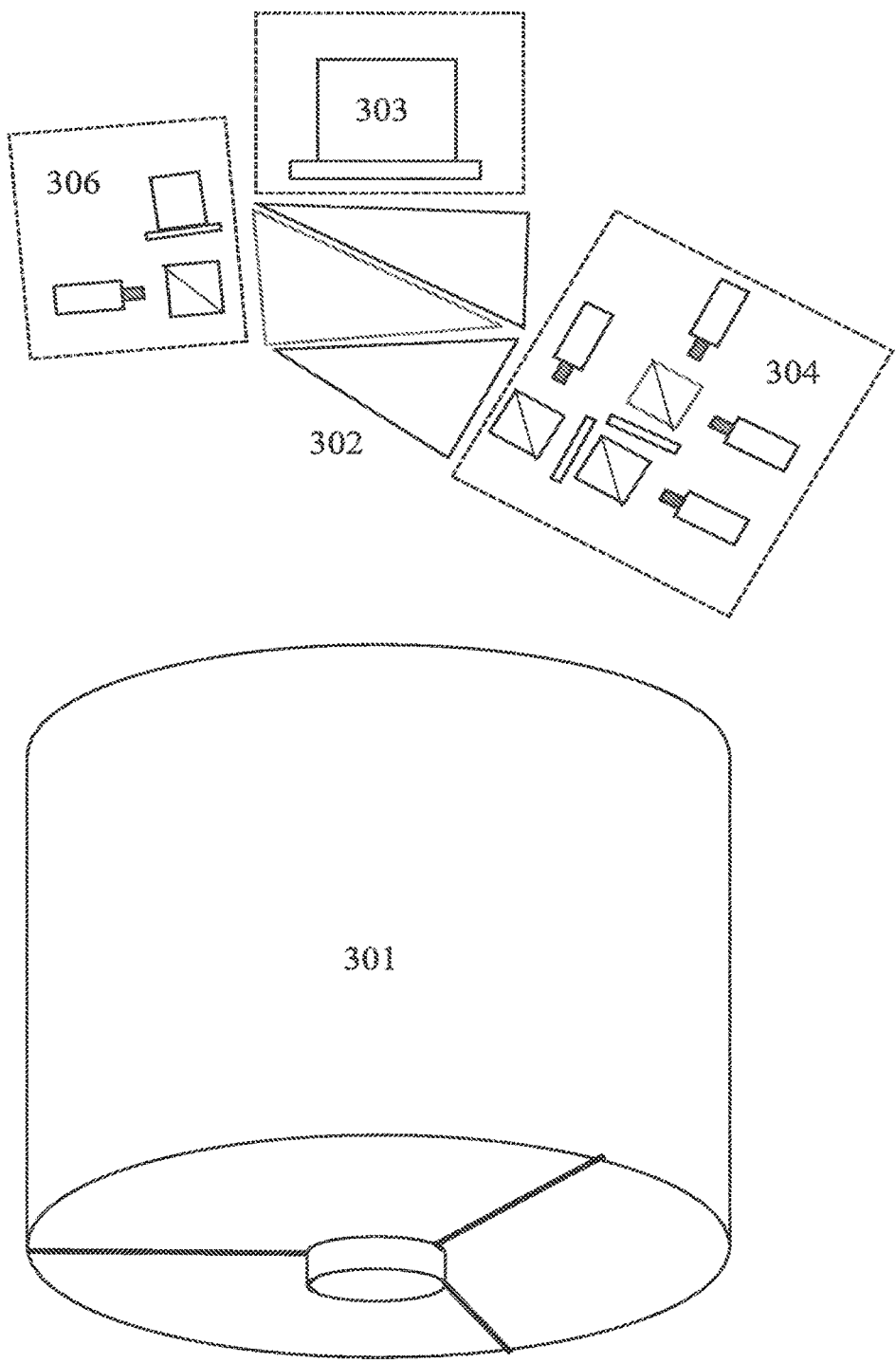
FIG. 3 is a schematic illustration of an imaging and quantum cryptography payload apparatus within a satellite, according to some embodiments of the present invention.

Reference is now made to FIG. 3, which is a schematic illustration of an imaging and quantum cryptography payload apparatus within a satellite, according to some embodiments of the present invention.

The high resolution camera 303 (imaging sensor) used for capturing high-resolution imagery. The high resolution camera 303 may be, for example a S-CMOS sensor with 5 micron pitch, resolution of 7090×6000 pixels, dynamic range of 72 decibels, and acquire light of wavelengths 400-750 nanometer (nm).

The QKD transmitter 304 is used for generating decoy-state QKD signal. The QKD transmitter 304 may include, for example, multiple SPD sensors and multiple fiber-based laser diodes with wavelength of 850 nm, pulse width of 0.2 nano-seconds and pulse rate of 100 megahertz.

The beacon 306 (alignment unit) used for locking and tracking the optical signal from the ground to satisfy is an accurate alignment between the QKD transmitter 304 and a ground reception apparatus throughout the QKD session. The beacon 306 may include, for example, a CMOS sensor, and may operate for wavelength of 532 nm, pulse width 0.9 nano-seconds, pulse rate of 15 kilohertz and frame rate 40 hertz.

The prism assembly 302 (light-directing optical setup) is used for separating the relevant received and transmitted EM signal. The prism assembly 302 may include, for example, 3 prisms directing light of 400-750 nm (for high resolution camera 303), 528-536 nm (for beacon 306) and 840-890 nm (for QKD transmitter 304).

The telescope 301 (light-refracting optical setup) is used for both gathering and transmitting of the EM signal. The telescope 301 may have, for example, clear aperture diameter of 50 centimeters.

The satellite payload includes a payload controller (not shown) able to operate the high resolution camera 303, the QKD transmitter 304 and the beacon 306. The satellite payload may be, for example, of a length of 1.5 meters (m), height of 0.6 m, width of 0.6 m and weight of 55 kilograms.

Free space QKD is not limited by nature to a specific frequency or type of electromagnetic wave. The practical challenge in building an efficient QKD system is to utilize an electro-optical apparatus capable of preserving the EM wave quantum information along the optical link while maximizing the average system transmission. The use of visible wavelength is highly common in remote sensing EO systems however it is usually not utilized for optical communication in optical fibers due to the high attenuation profile within the fibers. The preferred wavelength for single mode fiber, intended for long-distance applications, lay within the SWIR band, namely 1550 nm. Selecting SWIR band for free-space QKD may also be beneficial in reducing background light contributions to the channel noise and to avoid daytime traffic. Utilized during satellite eclipse the SWIR based free-space QKD is a viable QKD solution compatible also with modern fiber optics communication technology.

To allow operation of the QKD transmitter 304 and beacon 306, telescope 301 is required to transmit the relevant optical signal with minimal optical aberrations. The optics of the telescope 201 has to be of high optical quality, so it is diffraction limited, and have high structural and thermal stability with zero expansions thermal behavior. The actual size of the telescope aperture, as well any optical imperfections, might degrade the QKD performance but wouldn't necessarily prevent the QKD capability entirely. Also, the stability and pointing accuracy of the satellite system as a whole is important for the operation of the QKD transmitter 304 and beacon 306. The satellite pointing accuracy and pointing stability during an image capture should be better than three times the smallest detectable feature (on the ground) by the high resolution camera 303.

Figure 4:
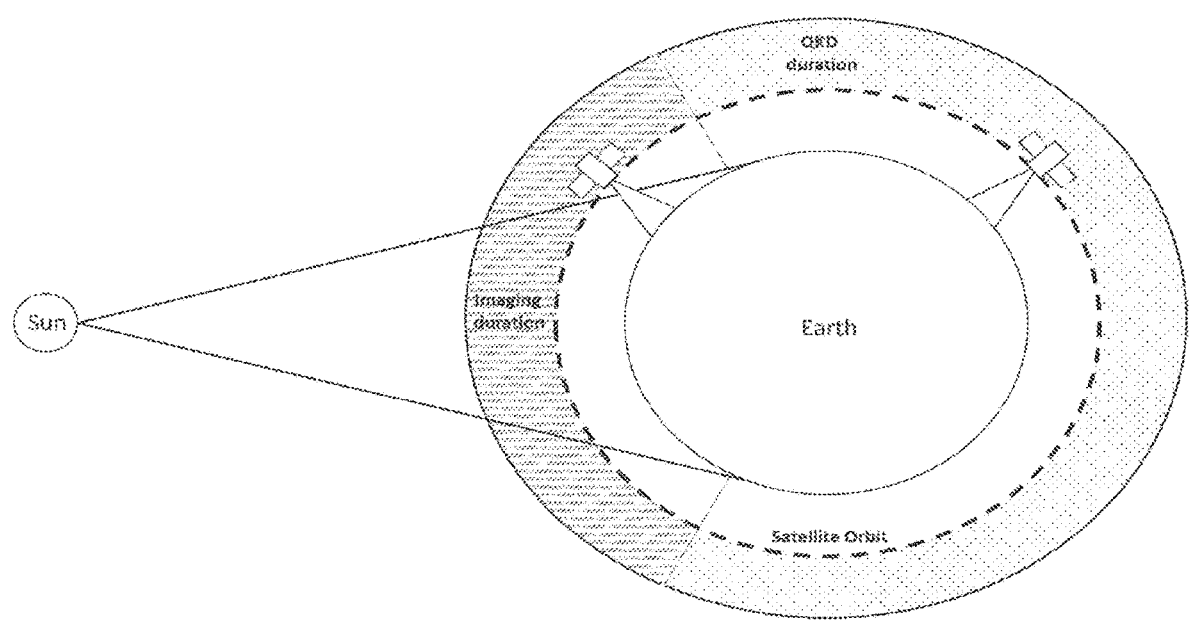
FIG. 4 is a schematic illustration of a use case for an imaging and quantum cryptography satellite payload apparatus during a satellite orbit, according to some embodiments of the present invention.

Reference is now made to FIG. 4, which is a schematic illustration of a use case for an imaging and quantum cryptography satellite payload apparatus during a satellite orbit, according to some embodiments of the present invention.

Remote sensing satellites operating within the visible spectrum, are usually acquiring region of interest (ROI) images while lighting conditions permits, typically from sun elevation of 10° over the horizon and above. For low earth orbit (LEO) satellites this condition is satisfied for up to 40% of the revolution duration, while during the rest of the revolution the satellite cannot perform imagery acquisition with satisfactory results. Considering the entire lifetime of these type of satellites, which is usually limited by the amount of fuel or sub-system degradation due to radiation or other environmental effects, approximately 60% of the time cannot be used in order achieve the primary mission of the satellites. In the remaining 60% of the revolution, while a typical EU satellite is non-usable, a QKD mission can be performed. A remote sensing and QKD payload can thus increase LEO satellite usability potential from 40% to 100% throughout the satellite lifetime.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant QKD systems will be developed and the scope of the term QKD is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

The invention claimed is:

1. An imaging and optical communication apparatus, comprising:
   (i) a light-refracting optical setup;
   (ii) a light-directing optical setup;
   (iii) a controller;
   (iv) at least one image capturing imaging sensor configured to capture light refracted from the light-refracting optical setup and directed to the imaging sensor by the light-directing optical setup;
   at least one of:
      a quantum key distribution (QKD) transmitter generating a QKD light signal and transmitting the QKD light signal via the light-directing optical setup and through the light-refracting optical setup;
      a QKD receiver acquiring and decoding light signals refracted from the light-refracting optical setup and directed to the QKD receiver by the light-directing optical setup; and
   an alignment unit that comprises a beacon configured for locking and tracking light signals, wherein the alignment unit is configured to align the at least one of QKD transmitter and QKD receiver to a coupled QKD apparatus that also comprises a similar alignment unit and a beacon based on light signals passing via the light-directing optical setup and the light-refracting optical setup and by using an image of the coupled QKD apparatus captured by said imaging sensor during said alignment;
   wherein the apparatus is implemented in a satellite orbiting a celestial body and designated to support a two-way classical optical communication,
   wherein said two-way classical optical communication is designated to enable transmission of data from the satellite and/or receive data from other source/s,
   wherein said QKD light signal is designated to enable said two-way classical optical communication in order to provide enhanced information security, and
   wherein a same optical channel is used for the two-way classical optical communication and QKD communication.

2. The system of claim 1, wherein the two-way classical optical communication is configured to enable data reception from a ground or space-based optical communication system to the said satellite orbiting the celestial body.

3. The system of claim 1, wherein the two-way classical optical communication is configured to enable data transmission from the satellite orbiting the celestial body to any ground or space-based optical communication system.

4. The system of claim 1, wherein the generation of the QKD light signal is based on an image captured by the satellite and later being translated to a random numerical sequence.

5. The system of claim 1, wherein the QKD transmitter is configured for transmission of raw image data in addition to QKD light signals.

* * * * *